(12) United States Patent
Takeichi et al.

(10) Patent No.: US 10,801,880 B2
(45) Date of Patent: *Oct. 13, 2020

(54) COMBINATION WEIGHING DEVICE WITH HOPPERS AND DISCHARGE CHUTES HAVING COMPLEMENTARY SURFACES

(71) Applicant: Ishida Co., Ltd., Kyoto (JP)

(72) Inventors: Shinji Takeichi, Ritto (JP); Toshiharu Kageyama, Ritto (JP); Mikio Kishikawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 172 days.

This patent is subject to a terminal disclaimer.

(21) Appl. No.: 16/083,820

(22) PCT Filed: Mar. 8, 2017

(86) PCT No.: PCT/JP2017/009271
§ 371 (c)(1),
(2) Date: Sep. 10, 2018

(87) PCT Pub. No.: WO2017/159500
PCT Pub. Date: Sep. 21, 2017

(65) Prior Publication Data
US 2019/0078929 A1 Mar. 14, 2019

(30) Foreign Application Priority Data
Mar. 18, 2016 (JP) .................. 2016-054929

(51) Int. Cl.
*G01G 19/387* (2006.01)
*G01G 13/18* (2006.01)
*G01G 19/393* (2006.01)

(52) U.S. Cl.
CPC ........... *G01G 19/393* (2013.01); *G01G 13/18* (2013.01); *G01G 19/387* (2013.01)

(58) Field of Classification Search
CPC ..... G01G 13/18; G01G 19/387; G01G 19/393
See application file for complete search history.

(56) References Cited

U.S. PATENT DOCUMENTS 3,239,108 A * 3/1966 Warner .................. B65B 37/04
222/196
3,305,067 A * 2/1967 Mayer .................. B65G 47/145
198/383

(Continued)

FOREIGN PATENT DOCUMENTS

| CN | 101581597 A | 11/2009 |
| CN | 101641578 A | 2/2010 |

(Continued)

OTHER PUBLICATIONS

Extended European Search Report issued by the European Patent Office dated Sep. 26, 2019, which corresponds to EP17766501.5-1001 and is related to U.S. Appl. No. 16/083,820.

(Continued)

*Primary Examiner* — Randy W Gibson
(74) *Attorney, Agent, or Firm* — Studebaker & Brackett PC

(57) ABSTRACT

A combination weighing apparatus includes a plurality of hoppers and a collecting chute. Each of the plurality of hoppers has a main body provided with a first opening and a second opening, and a gate allowed to be opened and closed with respect to the second opening. The main body is provided with a first inner surface and a second inner surface having an intersecting positional relationship to protrude outward with respect to the centerline. The collecting chute has at least a chute portion configured to receive articles discharged from the plurality of hoppers and slide the articles. A portion of the chute portion located below the plurality of hoppers is provided with a first receiving surface (Continued)

and a second receiving surface having an intersecting positional relationship to protrude outward with respect to the centerline.

4 Claims, 8 Drawing Sheets

(56) References Cited

U.S. PATENT DOCUMENTS

| | | | | |
|---|---|---|---|---|
| 4,444,283 A * | 4/1984 | Mikami | ............... | G01G 21/28 177/128 |
| 4,602,709 A | 7/1986 | Ueda | | |
| 4,972,031 A * | 11/1990 | Choate | ............... | C08L 61/06 524/456 |
| 5,646,374 A * | 7/1997 | Stapp | ............... | G01G 13/026 177/119 |
| 5,736,683 A | 4/1998 | Howard | | |
| 5,765,655 A * | 6/1998 | Tatsuoka | ............... | G01G 13/16 177/105 |
| 6,271,485 B1 * | 8/2001 | Richardson | ............... | B65G 47/1407 177/119 |
| 6,605,785 B1 * | 8/2003 | Muramiya | ............... | G01G 19/393 177/25.18 |
| 6,903,279 B2 * | 6/2005 | Taylor | ............... | G01G 13/16 177/25.18 |
| 9,459,133 B2 * | 10/2016 | Nagai | ............... | G01G 21/22 |
| 2019/0072425 A1 * | 3/2019 | Kageyama | ............... | G01G 21/22 |

FOREIGN PATENT DOCUMENTS

| | | |
|---|---|---|
| CN | 103026188 A | 4/2013 |
| CN | 103026189 A | 4/2013 |
| CN | 103168216 A | 6/2013 |
| EP | 2634545 A1 | 9/2013 |
| JP | S59-077037 U | 5/1984 |
| JP | H09-280931 A | 10/1997 |
| JP | 2001-183225 A | 7/2001 |
| JP | 2004-109078 A | 4/2004 |
| JP | 2007-279054 A | 10/2007 |
| JP | 4956156 B2 | 6/2012 |
| JP | 2014-126389 A | 7/2014 |
| WO | 2012/056495 A1 | 5/2012 |

OTHER PUBLICATIONS

International Search Report issued in PCT/JP2017/009271; dated Apr. 25, 2017.

Notification of Transmittal of Translation of the International Preliminary Report on Patentability (Chapter I) and Translation of Written Opinion of the International Searching Authority; PCT/JP2017/009271; dated Sep. 27, 2018.

An Office Action mailed by the Japanese Patent Office dated Nov. 19, 2019, which corresponds to Japanese Patent Application No. 2016-054929 and is related to U.S. Appl. No. 16/083,820; with English language translation.

An Office Action mailed by the State Intellectual Property Office of the People's Republic of China dated Nov. 5, 2019, which corresponds to Chinese Patent Application No. 201780017081.8 and is related to U.S. Appl. No. 16/083,820; with English language translation.

* cited by examiner (a)

(b)

(a)

(b)

(c)

COMBINATION WEIGHING DEVICE WITH HOPPERS AND DISCHARGE CHUTES HAVING COMPLEMENTARY SURFACES

TECHNICAL FIELD

The present disclosure relates to a combination weighing apparatus.

BACKGROUND ART

In a combination weighing apparatus, articles supplied from the outside (articles having variations in unit mass such as agricultural products, fishery products, and processed foods) are temporarily stored in a plurality of weighing hoppers, a weighing value corresponding to the mass of articles is weighed in each weighing hopper, and the articles are discharged to a collecting chute from a plurality of weighing hoppers selected so that a total value of weighing values corresponds to a target weighing value. The articles discharged to the collecting chute are collected together and discharged from the collecting chute to, for example, a bag making/packaging machine. In this instance, to rapidly and surely carry out packaging of the articles in the bag making/packaging machine, the articles discharged from the plurality of weighing hoppers to the collecting chute need to be discharged from the collecting chute in a short time. Therefore, various shapes of the collecting chute have been devised (for example, see Patent Literature 1).

CITATION LIST

Patent Literature

Patent Literature 1: Japanese Unexamined Patent Publication No. 2007-279054

SUMMARY OF INVENTION

Technical Problem

An object of the disclosure is to provide a combination weighing apparatus capable of discharging an article discharged from a hopper from a collecting chute in a short time.

Solution to Problem

A combination weighing apparatus according to an aspect of the disclosure includes a plurality of hoppers disposed to surround a centerline parallel to a vertical direction and configured to temporarily store articles supplied from an outside, and a collecting chute configured to discharge the articles discharged from the plurality of hoppers while collecting the articles, in which each of the plurality of hoppers has a main body provided with a first opening through which the articles are input and a second opening through which the articles are discharged, and a gate allowed to be opened and closed with respect to the second opening, the main body is provided with a first inner surface and a second inner surface having an intersecting positional relationship to protrude outward with respect to the centerline, the collecting chute has at least a chute portion configured to receive the articles discharged from the plurality of hoppers and slide the articles, and a portion of the chute portion located below the plurality of hoppers is provided with a first receiving surface and a second receiving surface having an intersecting positional relationship to protrude outward with respect to the centerline, the first receiving surface and the second receiving surface being surfaces corresponding to the first inner surface and the second inner surface, respectively.

In this combination weighing apparatus, the first inner surface and the second inner surface having the intersecting positional relationship to protrude outward with respect to the centerline are provided in the main body of the hopper. Further, the first receiving surface and the second receiving surface having the intersecting positional relationship to protrude outward with respect to the centerline are provided in the portion of the chute portion located below the hoppers. In this way, when the articles discharged from the hoppers reach the first receiving surface and the second receiving surface, a drop speed is made uniform at a center and both sides thereof. Moreover, since the first inner surface and the second inner surface have the intersecting positional relationship to protrude outward with respect to the centerline, the articles are discharged in a state of being collected together from the main body of the weighing hopper. Further, since the first receiving surface and the second receiving surface have the intersecting positional relationship to protrude outward with respect to the centerline, spread of the articles due to dropping is suppressed. Therefore, the articles received by the first receiving surface and the second receiving surface are collected together to slide on an upper stage chute portion. Therefore, according to the combination weighing apparatus, the articles discharged from the hoppers can be discharged from the collecting chute in a short time.

In the combination weighing apparatus according to the aspect of the disclosure, the second opening may be provided in the main body to be positioned on a lower side as the second opening is farther from the centerline, and the gate may be rotatably attached to a portion of an edge of the second opening in the main body on a side of the centerline. In this case, the articles drop in a more collected state along the first inner surface and the second inner surface of the main body.

In the combination weighing apparatus according to the aspect of the disclosure, a first distance between a lower end of the first inner surface and the first receiving surface in a vertical direction may be substantially constant, a second distance between a lower end of the second inner surface and the second receiving surface in the vertical direction may be substantially constant, and the first distance and the second distance may be substantially equal to each other. In this case, when the articles discharged from the hoppers reach the first receiving surface and the second receiving surface, the drop speed becomes substantially equal at the center and both sides thereof.

In the combination weighing apparatus according to the aspect of the disclosure, a plurality of sliding areas may be provided in the chute portion to extend from below the plurality of hoppers to the side of the centerline and be positioned on a lower side as approaching the centerline, each of the plurality of sliding areas may include a sliding surface forming a bottom surface of the sliding area, the first receiving surface connected to the sliding surface on one side of the sliding surface in a horizontal direction when viewed from the side of the centerline, and the second receiving surface connected to the sliding surface on the other side of the sliding surface in the horizontal direction when viewed from the side of the centerline, the sliding surface, the first receiving surface, and the second receiving surface may mutually have an intersecting positional relationship to protrude outward with respect to the centerline, a width of the sliding surface may increase as approaching the centerline, and a width of each of the first receiving surface and the second receiving surface may decrease as approaching the centerline.

In this case, the articles discharged from the hopers are received by the first receiving surface and the second receiving surface of the chute portion. In this instance, since the first receiving surface and the second receiving surface have the intersecting positional relationship to protrude outward with respect to the centerline, spread of the articles due to dropping is suppressed. Further, the articles received by the first receiving surface and the second receiving surface slide on the sliding surface of the chute portion. In this instance, since the width of the sliding surface increases as approaching the centerline, and the width of each of the first receiving surface and the second receiving surface decreases as approaching the centerline, friction, etc. occurring between the articles decreases, and the articles are collected together to smoothly slide on the sliding surface. Therefore, it is possible to discharge the articles discharged from the hoppers from the collecting chute in a short time.

Advantageous Effects of Invention

According to the disclosure, it is possible to provide a combination weighing apparatus capable of discharging an article discharged from a hopper from a collecting chute in a short time.

DESCRIPTION OF EMBODIMENTS

Hereinafter, an embodiment of the disclosure will be described in detail with reference to drawings. Incidentally, in each figure, the same or a corresponding part is denoted by the same reference symbol, and duplicate description is omitted.

[Overall Configuration of Combination Weighing Apparatus]

Figure 1:
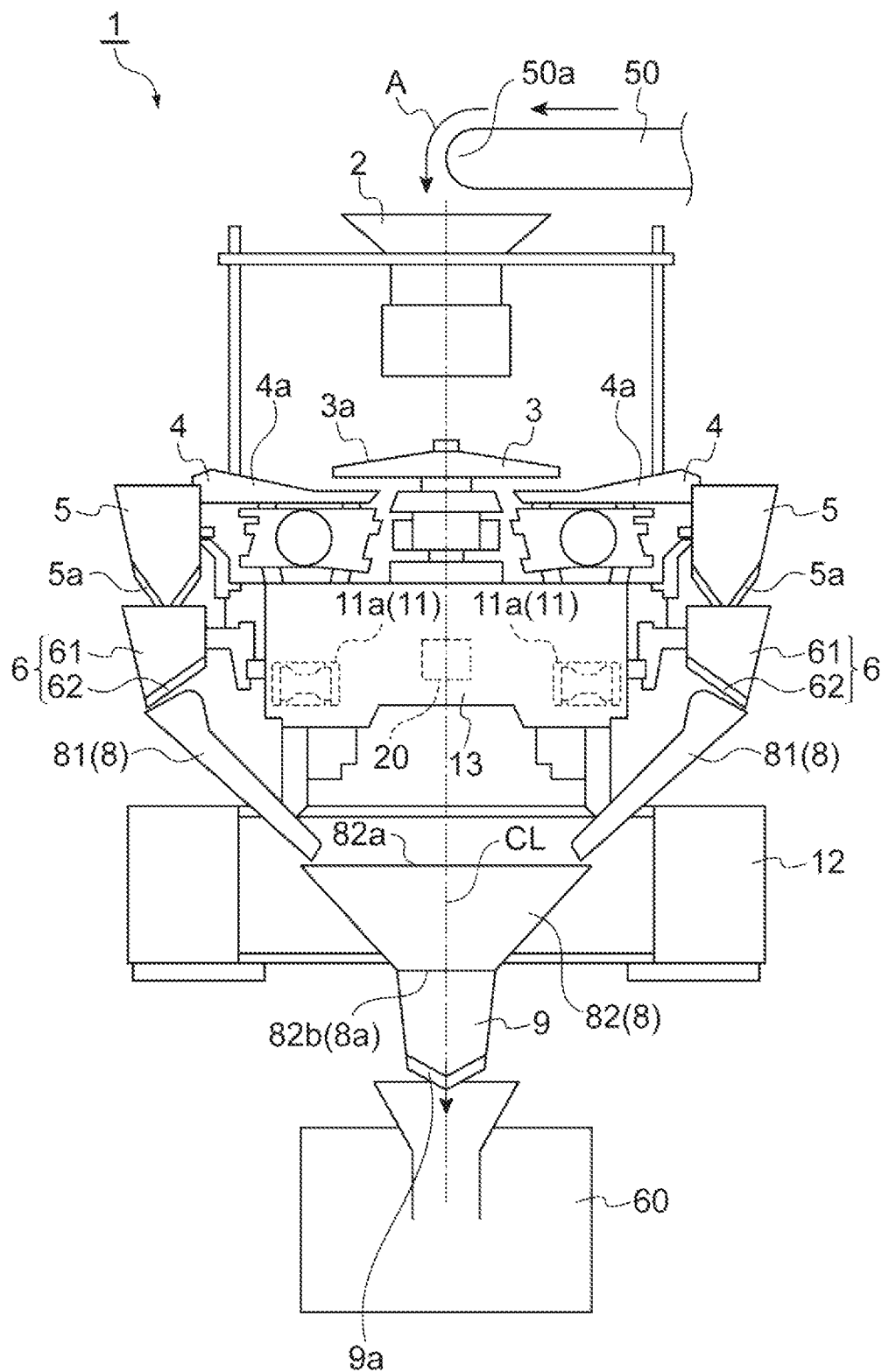
FIG. 1 is a configuration diagram of a combination weighing apparatus according to an embodiment.

As illustrated in FIG. 1, a combination weighing apparatus 1 includes an charge chute 2, a dispersion feeder 3, a plurality of radiation feeders 4, a plurality of pool hoppers 5, a plurality of weighing hoppers (hoppers) 6, a collecting chute 8, a timing hopper 9, a weighing unit 11, and a controller 20. The combination weighing apparatus 1 weighs articles A (articles having variations in unit mass such as agricultural products, fishery products, and processed foods) supplied by a conveyance conveyor 50 such that the articles A correspond to a target weighing value, and supplies the articles A to a bag making/packaging machine 60. Incidentally, the bag making/packaging machine 60 packages the articles A weighed and supplied by the combination weighing apparatus 1 while molding a film into a bag of a predetermined capacity.

The charge chute 2 is disposed below a conveying end 50a of the conveyance conveyor 50. The charge chute 2 receives the articles A conveyed from the outside by the conveyance conveyor 50 and dropped from the conveying end 50a of the conveyance conveyor 50, and discharges the articles A downward.

The dispersion feeder 3 is disposed below the charge chute 2. The dispersion feeder 3 has a conical conveying surface 3a that widens downward toward an end. The dispersion feeder 3 vibrates the conveying surface 3a to uniformly convey the articles A discharged from the charge chute 2 to a top of the conveying surface 3a toward an outer edge of the conveying surface 3a.

The plurality of radiation feeders 4 is radially arranged along the outer edge of the conveying surface 3a of the dispersion feeder 3. Each of the radiation feeders 4 has a trough 4a extending outward from below the outer edge of the conveying surface 3a. Each radiation feeder 4 conveys the articles A discharged from the outer edge of the conveying surface 3a toward a distal end of the trough 4a by vibrating the trough 4a.

The plurality of pool hoppers 5 is arranged to surround a centerline CL parallel to a vertical direction. Each of the pool hoppers 5 is disposed below the distal end of the trough 4a of each radiation feeder 4. Each pool hopper 5 has a gate 5a allowed to be opened and closed with respect to a bottom thereof. Each pool hopper 5 temporarily stores the articles A discharged from the distal end of the corresponding trough 4a by closing the gate 5a. Further, each pool hopper 5 discharges the temporarily stored articles A downward by opening the gate 5a.

The plurality of weighing hoppers 6 is arranged to surround the centerline CL. Each of the weighing hoppers 6 is disposed below the gate 5a of each pool hopper 5. Each weighing hopper 6 has a main body 61 and a gate 62 allowed to be opened and closed with respect to the bottom of the main body 61. Each weighing hopper 6 temporarily stores the articles A discharged from the corresponding pool hopper 5 in the main body 61 by closing the gate 62. Further, each weighing hopper 6 discharges the articles A temporarily stored in the main body 61 downward by opening the gate 62.

The collecting chute 8 collects the articles A discharged from each weighing hopper 6 at a discharge port 8a. The discharge port 8a is positioned on a lower side of the plurality of weighing hoppers 6 and on the centerline CL. The collecting chute 8 has an upper stage chute portion (chute portion) 81 and a lower stage chute portion 82. The upper stage chute portion 81 receives the articles A discharged from each weighing hopper 6 and slides the articles A to the discharge port 8a side (that is, the centerline CL side and the lower side). The lower stage chute portion 82 is a tubular body of a truncated conical shape tapered downward and has an upper opening 82a and a lower opening 82b. The lower stage chute portion 82 discharges the articles A from the discharge port 8a downward using the lower opening 82b as the discharge port 8a.

The timing hopper 9 is disposed below the discharge port 8a. The timing hopper 9 has a gate 9a allowed to be opened and closed with respect to a bottom thereof. The timing hopper 9 temporarily stores the articles A discharged from the collecting chute 8 by closing the gate 9a. Further, the timing hopper 9 discharges the temporarily stored articles A to the bag making/packaging machine 60 by opening the gate 9a.

The weighing unit 11 is disposed in a case 13 supported on a frame 12. The weighing unit 11 has a plurality of load cells 11a. Each of the load cells 11a supports a corresponding weighing hopper 6. When the articles A are temporarily stored in each weighing hopper 6, the weighing unit 11 weighs a weighing value according to the mass of the articles A.

The controller 20 is disposed in the case 13. The controller 20 includes a central processing unit (CPU), a read only memory (ROM), a random access memory (RAM), etc. The controller 20 controls an operation of each unit of the combination weighing apparatus 1 such as a conveying operation of the dispersion feeder 3 and the radiation feeder 4, an opening/closing operation of the gate 5a of each pool hopper 5, an opening/closing operation of the gate 62 of each weighing hopper 6, and an opening/closing operation of the gate 9a of the timing hopper 9. Incidentally, the controller 20 is connected to the bag making/packaging machine 60 such that communication is allowed.

The controller 20 stores the weighing value weighed by the weighing unit 11 and the weighing hopper 6 that stores the articles A corresponding to the weighing value in association with each other. The controller 20 selects a combination of weighing values from a plurality of weighting values weighed by the weighing unit 11 and associated with the respective weighing hoppers 6 so that a total value becomes a target weighing value. More specifically, the controller 20 selects a combination of weighing values from a plurality of weighting values output by the weighing unit 11 so that a total value falls within a predetermined range having the target weighing value as a lower limit. Then, the controller 20 causes the weighing hopper 6 corresponding to the combination to discharge the articles A.

Incidentally, the charge chute 2, the dispersion feeder 3, the plurality of radiation feeders 4, the plurality of pool hoppers 5 and the plurality of weighing hoppers 6 are directly or indirectly supported by the case 13. The collecting chute 8 and the timing hopper 9 are directly or indirectly supported on the frame 12.

[Configuration of Upper Stage Chute Portion of Collecting Chute]

Figure 2:
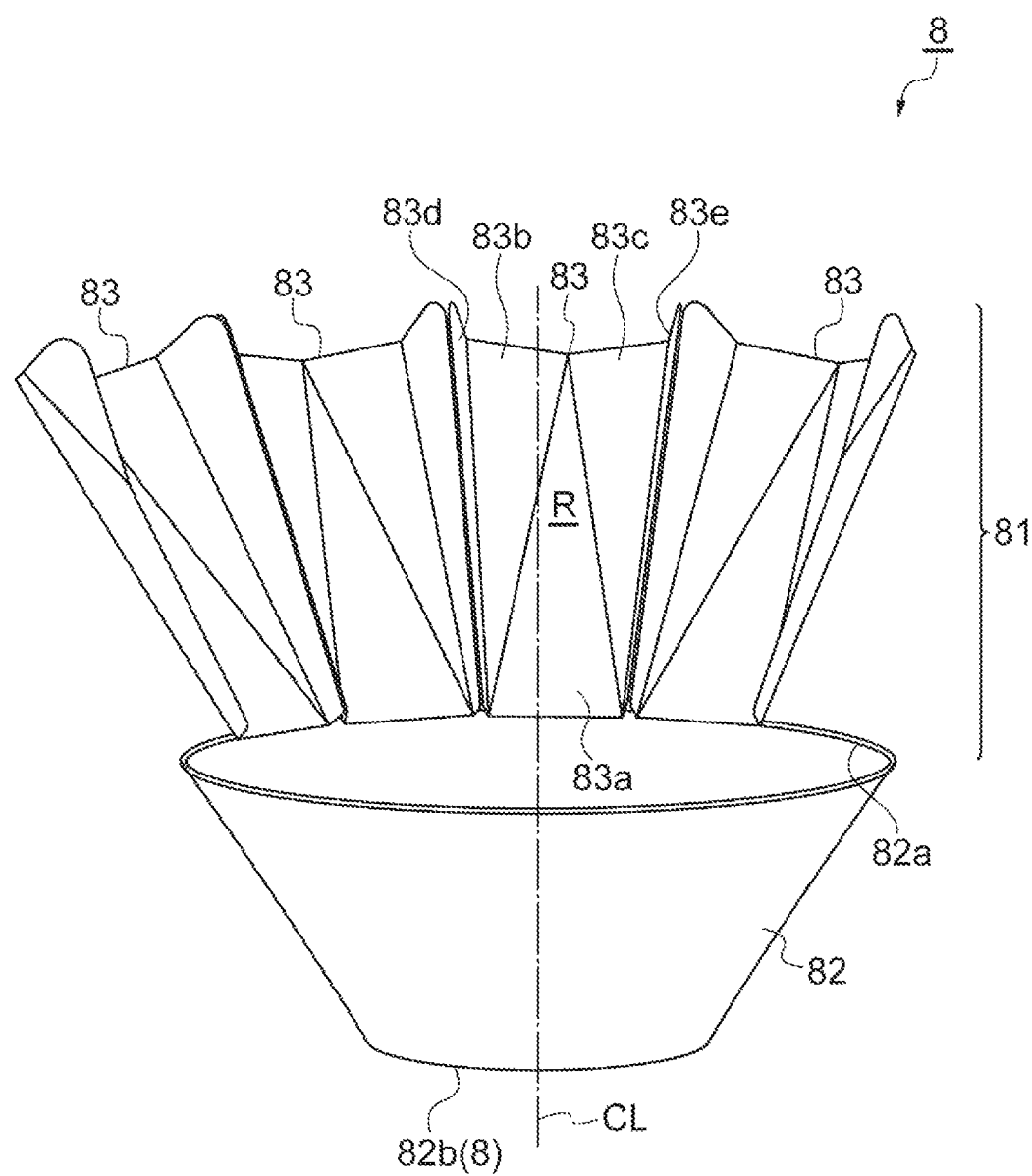
FIG. 2 is a perspective view of a collecting chute of the combination weighing apparatus of FIG. 1.

As illustrated in FIG. 2, in the collecting chute 8, the upper stage chute portion 81 has a plurality of sliding areas R. Each of the sliding areas R extends from below each weighing hopper 6 to the centerline CL side so as to be positioned on the lower side as approaching the centerline CL (see FIG. 1). Each sliding area R is composed of a partition member 83 formed by bending a metal plate. More specifically, each sliding area R includes a sliding surface 83a, a first receiving surface 83b, a second receiving surface 83c, a first side surface 83d, and a second side surface 83e which are inner surfaces of each partitioning member 83. Incidentally, in FIG. 2, illustration of a part of the partition member 83 is omitted.

The sliding surface 83a forms a bottom surface of the sliding area R and extends from below the weighing hopper 6 to an outer edge of the opening 82a of the lower stage chute portion 82. The sliding surface 83a is a flat surface, and has a triangular shape (an isosceles triangle shape in which a base is positioned on the centerline CL side) in which one side is positioned on the centerline CL side and one vertex is positioned on an opposite side from the centerline CL side).

The first receiving surface 83b is directly connected to the sliding surface 83a on one side of the sliding surface 83a in a horizontal direction when viewed from the centerline CL side and extends from below the weighing hopper 6 to the outer edge of the opening 82a of the lower stage chute portion 82. The first receiving surface 83b is a flat surface, and has a triangular shape in which one vertex is positioned on the centerline CL side and one side is positioned on an opposite side from the centerline CL side. Incidentally, "one surface is directly connected to the other surface" means that substantially no other surface is interposed between one surface and the other surface, and includes a case in which a chamfered surface, etc. is interposed between one surface and the other surface in addition to a case in which one surface and the other surface are directly connected to each other (hereinafter the same).

The second receiving surface 83e is directly connected to the sliding surface 83a on the other side of the sliding surface 83a in the horizontal direction when viewed from the centerline CL side and extends from below the weighing hopper 6 to the outer edge of the opening 82a of the lower stage chute portion 82. The second receiving surface 83c is a flat surface, and has a triangular shape in which one vertex is positioned on the centerline CL side and one side is positioned on an opposite side from the centerline CL side.

A width of the sliding surface 83a (width in the horizontal direction) increases as approaching the centerline CL. A width of each of the first receiving surface 83b and the second receiving surface 83c (width in the horizontal direction) decreases as approaching the centerline CL. The sliding surface 83a and the first receiving surface 83b have an intersecting positional relationship to protrude outward with respect to the centerline CL (to form a valley fold). Similarly, the sliding surface 83a and the second receiving surface 83c have the intersecting positional relationship to protrude outward with respect to the centerline CL (to form a valley fold). Further, the first receiving surface 83b and the second receiving surface 83c also have the intersecting positional relationship to protrude outward with respect to the centerline CL (to form a valley fold) (even though the first receiving surface 83b and the second receiving surface 83c do not directly intersect each other, surfaces including the first receiving surface 83b and the second receiving surface 83c intersect each other to protrude outward with respect to the centerline CL). In this way, the sliding surface 83a, the first receiving surface 83b, and the second receiving surface 83c mutually have the intersecting positional relationship to protrude outward with respect to the centerline CL.

The first side surface 83d is directly connected to the first receiving surface 83b on one side of the first receiving surface 83b in the horizontal direction when viewed from the centerline CL side, and extends from below the weighing hopper 6 to the outer edge of the opening 82a of the lower stage chute portion 82. The first side surface 83d is a flat surface and has a rectangular shape. The second side surface 83e is directly connected to the second receiving surface 83c on the other side of the second receiving surface 83c in the horizontal direction when viewed from the centerline CL side, and extends from below the weighing hopper 6 to the outer edge of the opening 82a of the lower stage chute portion 82. The second side surface 83e is a flat surface and has a rectangular shape. The first side surface 83d and the second side surface 83e face each other through the sliding area R.

[Relationship Between Weighing Hopper and Collecting Chute]

Figure 3:
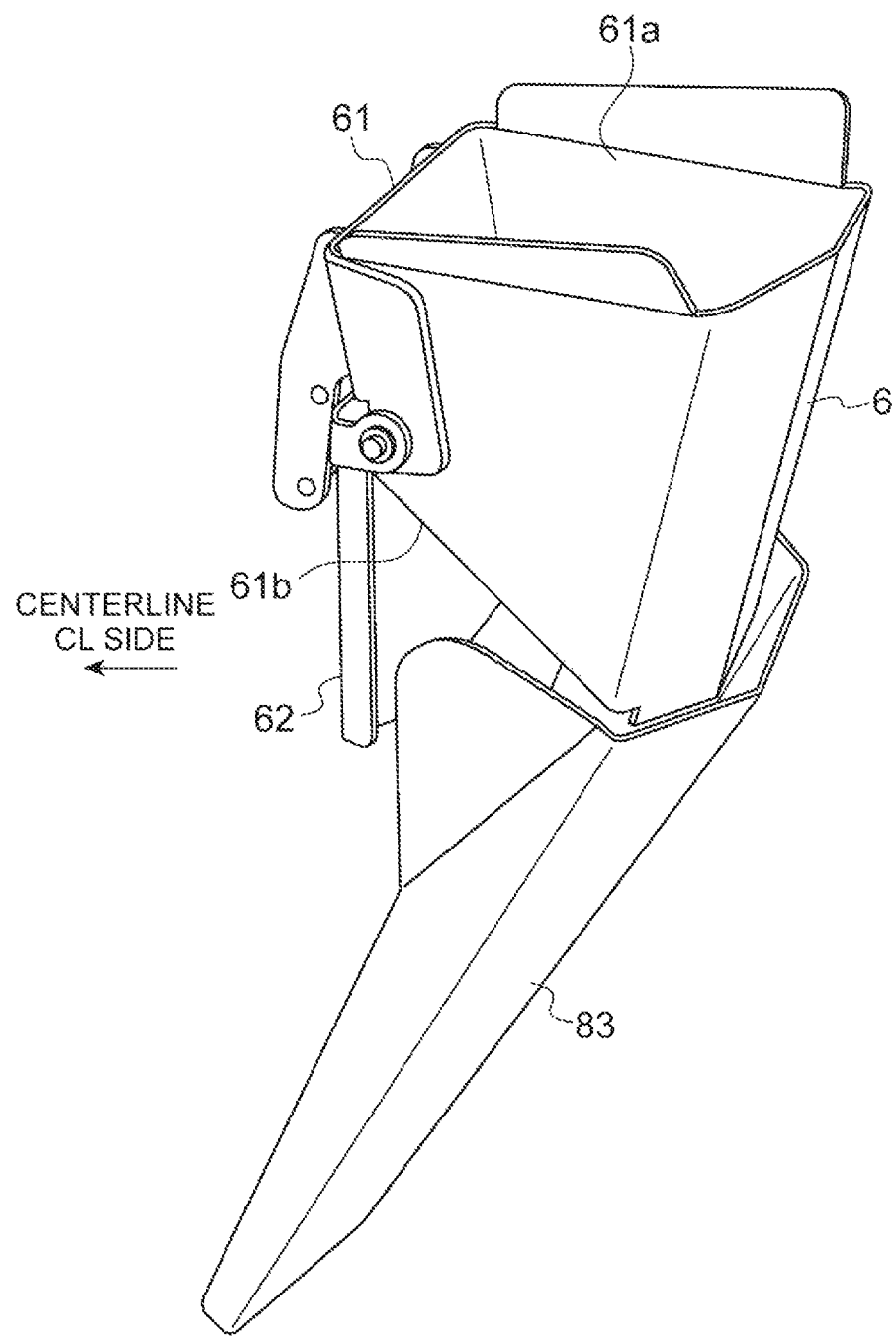
FIG. 3 is a diagram illustrating a relationship between a weighing hopper and the collecting chute in the combination weighing apparatus of FIG. 1.

As illustrated in FIG. 3, the main body 61 of the weighing hopper 6 is a pentagonal pillar-shaped tubular body, and has an upper opening (first opening) 61a and a lower opening (second opening) 61b. The upper opening 61a into which the articles A are put is provided substantially horizontally in the main body 61. The lower opening 61b from which the articles A are discharged is provided in the main body 61 so as to be positioned on the lower side as the lower opening 61b is farther from the centerline CL. The gate 62 is rotatably attached to a portion of an edge of the lower opening 61b in the main body 61 on the centerline CL side, and is allowed to be opened and closed with respect to the lower opening 61b.

Figure 4:
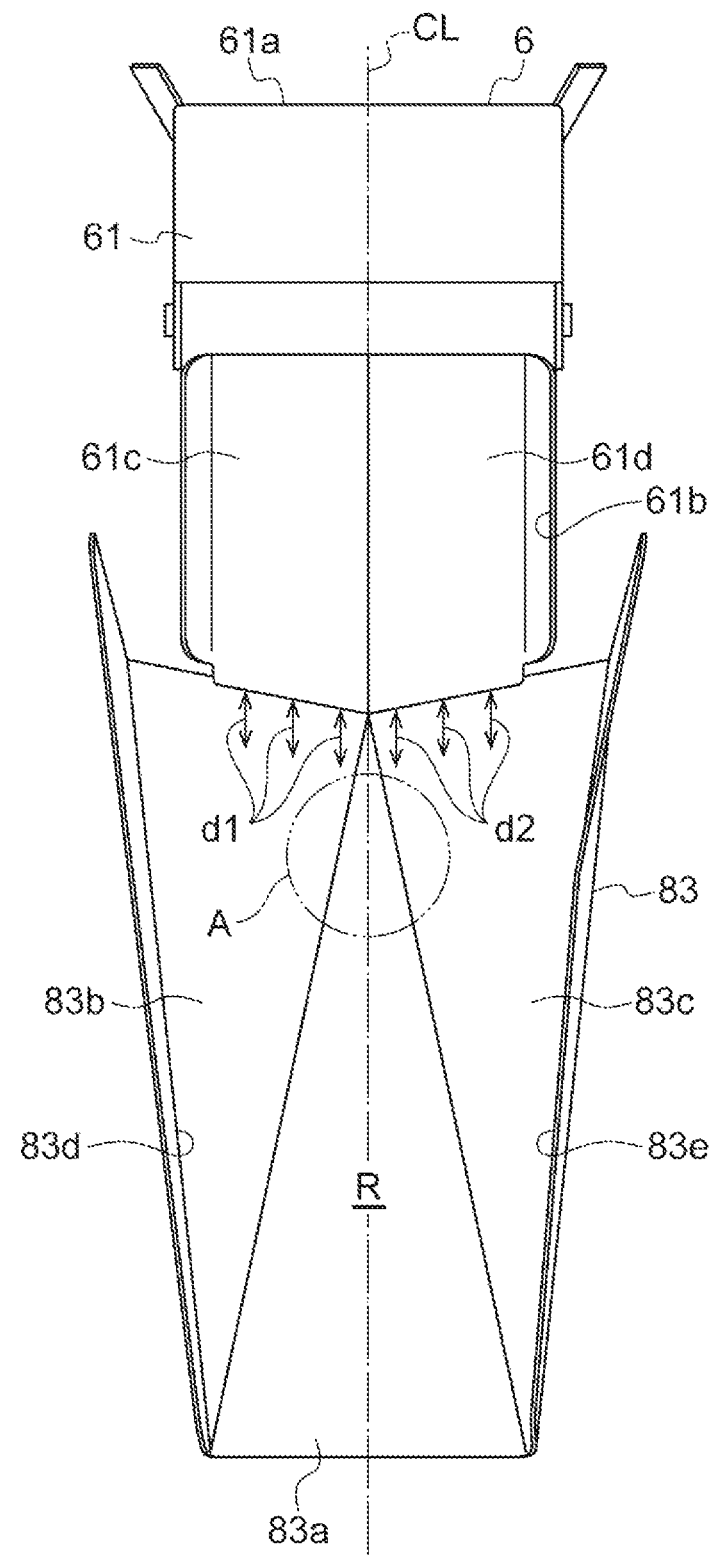
FIG. 4 is a diagram illustrating a relationship between the weighing hopper and the collecting chute in the combination weighing apparatus of FIG. 1.

As illustrated in FIG. 4, the main body 61 is provided with a first inner surface 61c and a second inner surface 61d having the intersecting positional relationship to protrude outward with respect to the centerline CL (to form a valley fold). An upper end of the first receiving surface 83b of the partition member 83 is positioned below a lower end of the first inner surface 61c. Similarly, an upper end of the second receiving surface 83c of the partition member 83 is positioned below a lower end of the second inner surface 61d. In this way, the first receiving surface 83b and the second receiving surface 83c of each partition member 83, which are surfaces corresponding to the first inner surface 61c and the second inner surface 61d, respectively, are disposed in a portion positioned below each weighing hopper 6 in the upper stage chute portion 81.

A first distance d1 between a lower end of the first inner surface 61c and the first receiving surface 83b in the vertical direction is substantially constant. A second distance d2 between a lower end of the second inner surface 61d and the second receiving surface 83c in the vertical direction is substantially constant. The first distance d1 and the second distance d2 are substantially equal to each other.

Action and Effect

In the combination weighing apparatus 1, the first inner surface 61c and the second inner surface 61d having the intersecting positional relationship to protrude outward with respect to the centerline CL are provided in the main body 61 of the weighing hopper 6. Further, the first receiving surface 83b and the second receiving surface 83c having the intersecting positional relationship to protrude outward with respect to the centerline CL are provided in a portion of the upper stage chute portion 81 below the weighing hopper 6. In this way, when the articles A discharged from the weighing hopper 6 reach the first receiving surface 83b and the second receiving surface 83c, a drop speed is made uniform at a center and both sides thereof. Moreover, since the first inner surface 61c and the second inner surface 61d have the intersecting positional relationship to protrude outward with respect to the centerline CL, the articles A are discharged in a state of being collected together from the main body 61 of the weighing hopper 6. Further, since the first receiving surface 83b and the second receiving surface 83c have the intersecting positional relationship to protrude outward with respect to the centerline CL, spread of the articles A due to dropping is suppressed. Therefore, the articles A received by the first receiving surface 83b and the second receiving surface 83c are collected together (see a two-dot chain line of FIG. 4) to slide on the upper stage chute portion 81 toward the discharge port 8a side of the lower stage chute portion 82. Therefore, according to the combination weighing apparatus 1, the articles A discharged from the weighing hopper 6 can be discharged from the collecting chute 8 in a short time.

In addition, in the combination weighing apparatus 1, in each weighing hopper 6, the opening 61b is provided in the main body 61 so as to be positioned on the lower side as the opening 61b is farther from the centerline CL, and the gate 62 is rotatably attached to the portion of the edge of the opening 61b in the main body 61 on the centerline CL side. In this way, the articles A drops in a more collected state along the first inner surface 61c and the second inner surface 61d of the main body 61.

In addition, in the combination weighing apparatus 1, the first distance d1 between the lower end of the first inner surface 61c and the first receiving surface 83b in the vertical direction is substantially constant, the second distance d2 between the lower end of the second inner surface 61d and the second receiving surface 83c in the vertical direction is substantially constant, and the first distance d1 and the second distance d2 are substantially equal to each other. In this way, when the articles A discharged from the weighing hopper 6 reach the first receiving surface 83b and the second receiving surface 83c, the drop speed becomes substantially equal at the center and both sides thereof.

Figure 5:
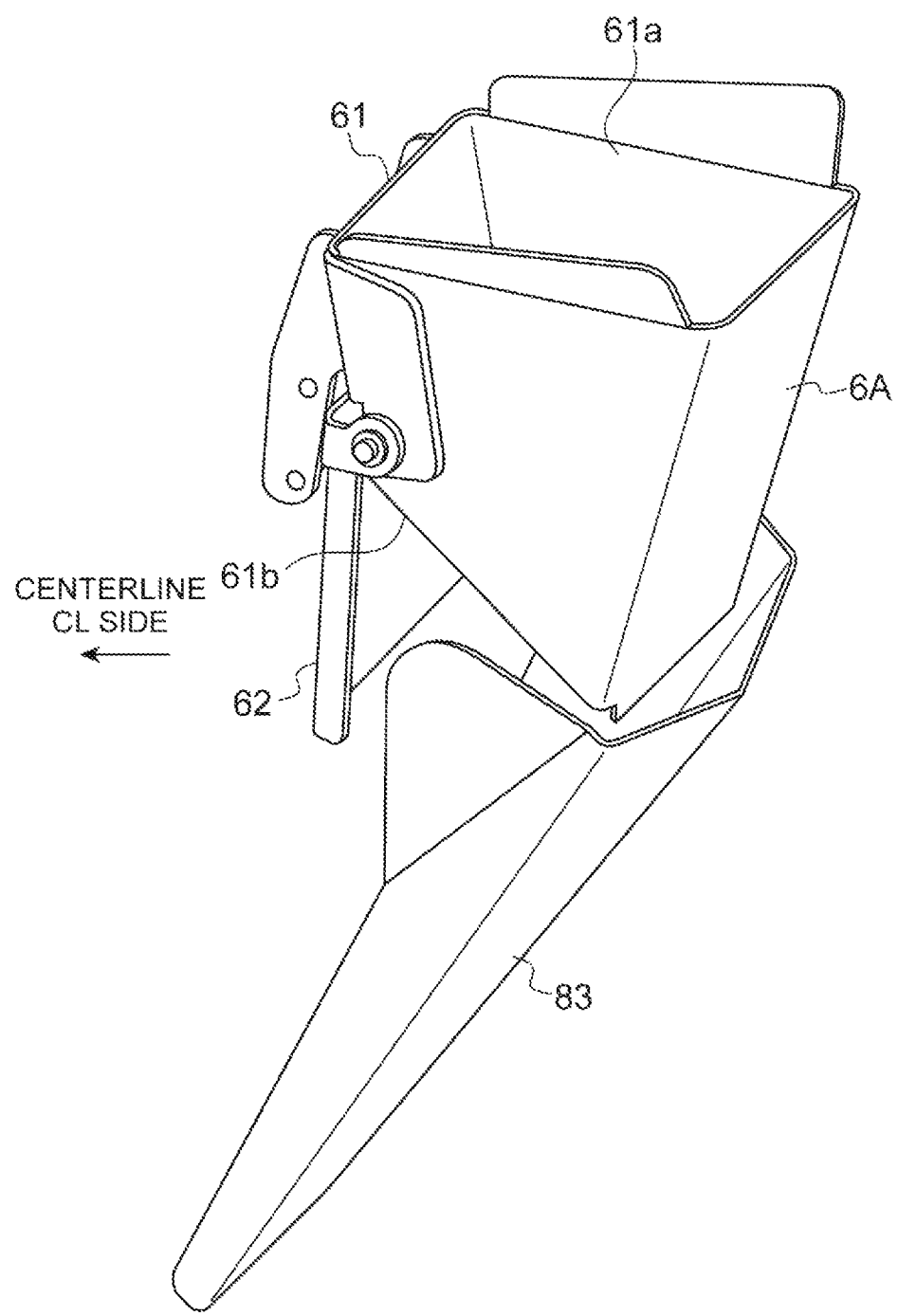
FIG. 5 is a diagram illustrating a relationship between a weighing hopper and a collecting chute of a comparative example.
Figure 6:
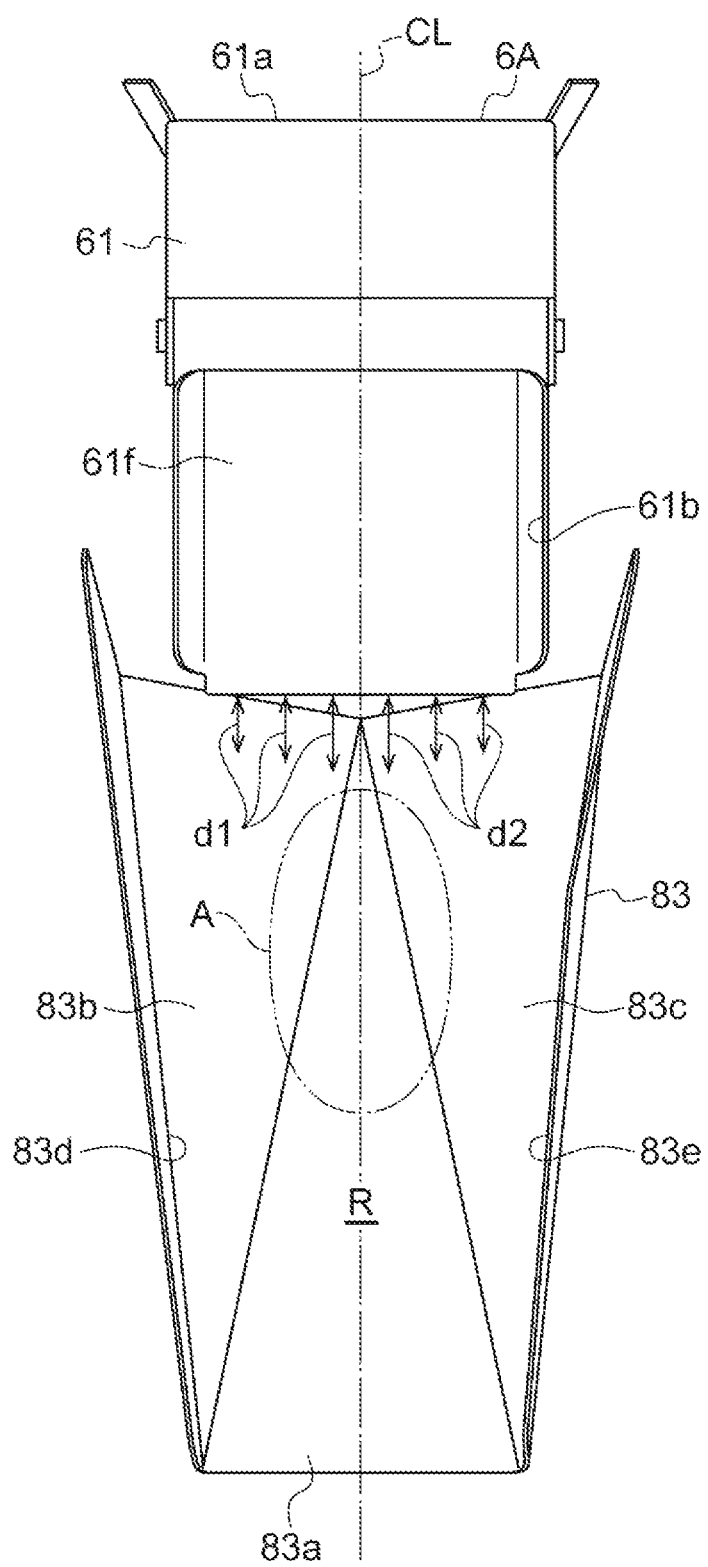
FIG. 6 is a diagram illustrating a relationship between the weighing hopper and the collecting chute of the comparative example.

As a comparative example, when a main body 61 of the weighing hopper 6A is a square pillar-shaped tubular body as illustrated in FIG. 5, and an inner surface 61f facing the centerline CL side is one plane as illustrated in FIG. 6, the articles A received by the first receiving surface 83b and the second receiving surface 83c vertically extend when compared to a case indicated by the two-dot chain line in FIG. 4 (see a two-dot chain line of FIG. 6). This is because each of a first distance d1 between a lower end of the inner surface 61f and the first receiving surface 83b in the vertical direction and a second distance d2 between the lower end of the inner surface 61f and the second receiving surface 83c in the vertical direction increases toward a center, and a drop speed increases toward the center when the articles A discharged from the weighing hopper 6 reach the first receiving surface 83b and the second receiving surface 83c.

In addition, in the combination weighing apparatus 1, the articles A discharged from the weighing hopper 6 are received by the first receiving surface 83b and the second receiving surface 83c of the upper stage chute portion 81. In this instance, since the first receiving surface 83b and the second receiving surface 83c have the intersecting positional relationship to protrude outward with respect to the centerline CL, spread of the articles A due to dropping is suppressed. Further, the articles A received by the first receiving surface 83b and the second receiving surface 83c slide on the sliding surface 83a of the upper stage chute portion 81 toward the discharge port 8a side of the lower stage chute portion 82. In this instance, since the width of the sliding surface 83a increases as approaching the centerline CL, and the width of each of the first receiving surface 83b and the second receiving surface 83c decreases as approaching the centerline CL, friction, etc. occurring between the articles A decreases, and the articles A are collected together to smoothly slide on the sliding surface 83a. Moreover, since spread of the articles A due to dropping is suppressed, friction due to contact between the articles A and the first side surface 83d and the second side surface 83e is reduced, and the articles A are collected together to smoothly slide on the sliding surface 83a. Therefore, according to the combination weighing apparatus 1, it is possible to discharge the articles A discharged from the weighing hopper 6 from the collecting chute 8 in a short time.

In addition, in the combination weighing apparatus 1, each of the sliding surface 83*a*, the first receiving surface 83*b* and the second receiving surface 83*c* is a flat surface, and each of the first receiving surface 83*b* and the second receiving surface 83*c* is directly connected to the sliding surface 83*a*. In this way, for example, the sliding surface 83*a*, the first receiving surface 83*b*, and the second receiving surface 83*c* can be easily configured by bending a plate material.

In addition, in the combination weighing apparatus 1, the sliding surface 83*a* has the triangular shape in which one side is positioned on the centerline CL side and one vertex is positioned on the opposite side from the centerline CL side, and each of the first receiving surface 83*b* and the second receiving surface 83*c* has the triangular shape in which one vertex is positioned on the centerline CL side and one side is positioned on the opposite side from the centerline CL side. In this way, it is possible to appropriately implement a configuration in which the width of the sliding surface 83*a* increases as approaching the centerline CL and the width of each of the first receiving surface 83*b* and the second receiving surface 83*c* decreases as approaching the centerline CL.

[Modification]

Figure 7:
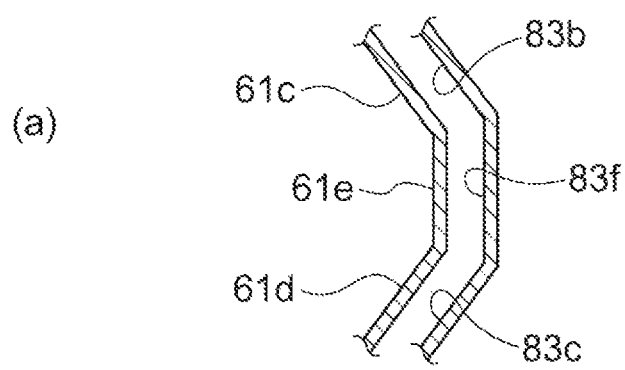
FIG. 7 is a diagram illustrating a relationship between a weighing hopper and a collecting chute of a modification.
Figure 7:
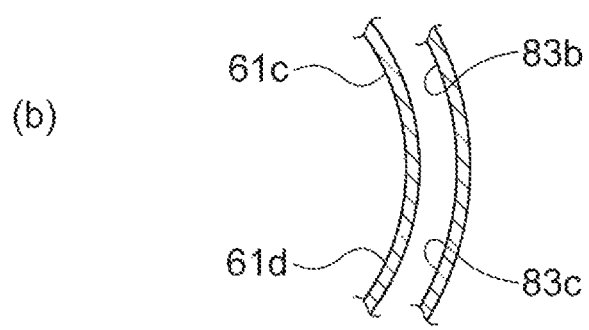

Even though the embodiment of the disclosure has been described above, the combination weighing apparatus of the disclosure is not limited to the above-described embodiment. For example, in the main body 61 of the weighing hopper 6, the first inner surface 61*c* and the second inner surface 61*d* may not be directly connected to each other. As an example, as illustrated in FIG. 7(*a*), the first inner surface 61*c* and the second inner surface 61*d* may be indirectly connected to each other through another surface 61*e*. Similarly, in the partition member 83, the first receiving surface 83*b* and the second receiving surface 83*c* may be directly connected to each other. As an example, as illustrated in FIG. 7(*a*), the first receiving surface 83*b* and the second receiving surface 83*c* may be indirectly connected to each other through another surface 83*f*.

In addition, in the main body 61 of the weighing hopper 6, the first inner surface 61*c* and the second inner surface 61*d* may not be the flat surfaces. As an example, as illustrated in FIG. 7(*b*), the first inner surface 61*c* and the second inner surface 61*d* may be curved surfaces. Similarly, in the partition member 83, the first receiving surface 83*b* and the second receiving surface 83*c* may not be the flat surfaces. As an example, as illustrated in FIG. 7(*b*), the first receiving surface 83*b* and the second receiving surface 83*c* may be curved surfaces.

In addition, when the main body 61 of the weighing hopper 6 is provided with the first inner surface 61*c* and the second inner, surface 61*d* having the intersecting positional relationship to protrude outward with respect to the centerline CL, and a portion of the upper stage chute portion 81 located below each weighing hopper 6 is provided with the first receiving surface 83*b* and the second receiving surface 83*c* having the intersecting positional relationship to protrude outward with respect to the centerline CL, each of the first distance d1 and the second distance d2 may not be substantially constant, and the first distance d1 and the second distance d2 may not be substantially equal to each other.

Figure 8:
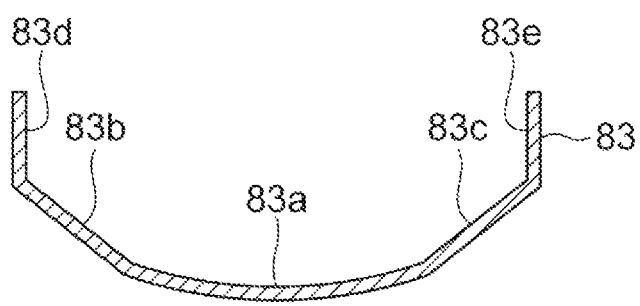
FIG. 8 is a cross-sectional view of a partition member of the collecting chute of the modification.
Figure 8:
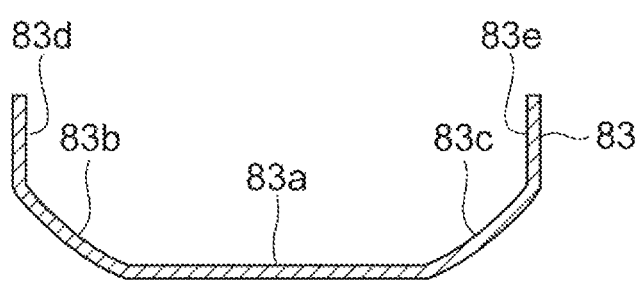
Figure 8:
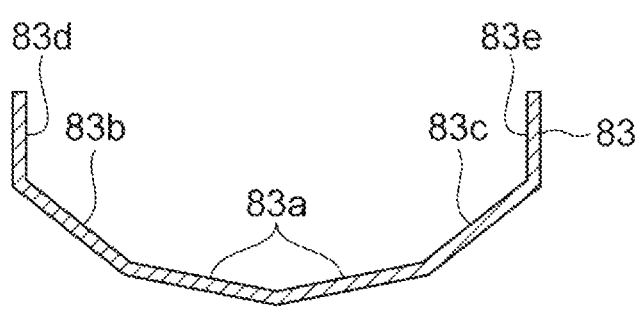

In addition, as illustrated in FIG. 8(*a*), the sliding surface 83*a* may not be the flat surface and may be a curved surface.

In addition, as illustrated in FIG. 8(*b*), each of the first receiving surface 83*b* and the second receiving surface 83*c* may not be the flat surface and may be a curved surface. In addition, as illustrated in FIG. 8(*c*), the sliding surface 83*a* may not be the one plane and may include a plurality of flat surfaces or a plurality of curved surfaces.

In addition, the shape of the sliding surface 83*a* is not limited to the triangular shape in which one side is positioned on the centerline CL side and one vertex is positioned on the opposite side from the centerline CL side. For example, it is possible to adopt a trapezoidal shape in which a long base is located on the centerline CL side and a short base is located on the opposite side from the centerline CL side, etc. as long as the width of the sliding surface 83*a* increases as approaching the centerline CL. In addition, the shape of each of the first receiving surface 83*b* and the second receiving surface 83*c* is not limited to the triangular shape in which one vertex is positioned on the centerline CL side and one side is positioned on the opposite side from the centerline CL side. For example, it is possible to adopt a trapezoidal shape in which a short base is located on the centerline CL side and a long base is located on the opposite side from the centerline CL side, etc. as long as the width of each of the first receiving surface 83*b* and the second receiving surface 83*c* decreases as approaching the centerline CL.

In addition, the sliding surface 83*a* is not limited to a surface extending from below the weighing hopper 6 to the outer edge of the opening 82*a* of the lower stage chute portion 82, and may be a surface extending from a middle of the sliding area R to the outer edge of the opening 82*a* of the lower stage chute portion 82. That is, the width of the sliding surface 83*a* may be zero below the weighing hopper 6. In addition, each of the first receiving surface 83*b* and the second receiving surface 83*c* is not limited to a surface extending from below the weighing hopper 6 to the outer edge of the opening 82*a* of the lower stage chute portion 82, and may be a surface extending from below the weighing hopper 6 to the middle of the sliding area R. That is, the width of each of the first receiving surface 83*b* and the second receiving surface 83*c* may be zero at the outer edge of the opening 82*a* of the lower stage chute portion 82.

As described above, the shape of the sliding surface 83*a* may be a shape in which the width of the sliding surface 83*a* increases as approaching the centerline CL within a preset upper limit as a limit. In addition, the shape of each of the first receiving surface 83*b* and the second receiving surface 83*c* may be a shape in which the width of each of the first receiving surface 83*b* and the second receiving surface 83*c* decreases as approaching the centerline CL within a preset lower limit as a limit. In these cases, it is possible to appropriately implement a configuration in which the width of the sliding surface 83*a* increases as approaching the centerline CL and the width of each of the first receiving surface 83*b* and the second receiving surface 83*c* decreases as approaching the centerline CL.

In addition, in the partition member 83, each of the first receiving surface 83*b* and the second receiving surface 83*c* may not be directly connected to the sliding surface 83*a*. That is, the first receiving surface 83*b* and the second receiving surface 83*c* may be indirectly connected to the sliding surface 83*a* through another surface.

In addition, the combination weighing apparatus 1 may not include the timing hopper 9. The configuration of the combination weighing apparatus of the disclosure capable of discharging the articles discharged from the hopper in a state of being collected together from the collecting chute is particularly effective when the combination weighing apparatus 1 does not include the timing hopper 9.

In addition, the collecting chute 8 may not have the lower stage chute portion 82. For example, when the bag making/packaging machine 60 has a configuration corresponding to the lower stage chute portion 82, the need for the collecting chute 8 of the combination weighing apparatus 1 to have the lower stage chute portion 82 is low.

In addition, in the above-described embodiment, the weighing hopper 6 and the sliding area R (partition member 83) correspond to each other on a one-to-one basis. However, for example, one sliding area R (partition member 83) may correspond to a plurality of weighing hoppers 6.

REFERENCE SIGNS LIST

1: combination weighing apparatus, 6: weighing hopper (hopper), 8: collecting chute, 61: main body, 61a: opening (first opening), 61b: opening (second opening), 61c: first inner surface, 61d: second inner surface, 62: gate, 81: upper stage chute portion (chute portion), 83a: sliding surface, 83b: first receiving surface, 83c: second receiving surface, A: articles, CL: centerline, R: sliding area.

The invention claimed is:

1. A combination weighing apparatus comprising:
 a plurality of hoppers disposed to surround a centerline parallel to a vertical direction and configured to temporarily store articles supplied from an outside; and
 a collecting chute configured to discharge the articles discharged from the plurality of hoppers while collecting the articles,
 wherein each of the plurality of hoppers has
 a main body provided with a first opening through which the articles are input and a second opening through which the articles are discharged, and
 a gate allowed to be opened and closed with respect to the second opening,
 the main body is provided with a first inner surface and a second inner surface having an intersecting positional relationship to protrude outward with respect to the centerline,
 the collecting chute has at least a chute portion configured to receive the articles discharged from the plurality of hoppers and slide the articles, and
 a portion of the chute portion located below the plurality of hoppers is provided with a first receiving surface and a second receiving surface having an intersecting positional relationship to protrude outward with respect to the centerline, the first receiving surface and the second receiving surface being surfaces complementary to the first inner surface and the second inner surface, respectively.

2. The combination weighing apparatus according to claim 1,
 wherein the second opening is provided in the main body to be positioned on a lower side as the second opening is farther from the centerline, and
 the gate is rotatably attached to a portion of an edge of the second opening in the main body on a side of the centerline.

3. The combination weighing apparatus according to claim 1,
 wherein a first distance between a lower end of the first inner surface and the first receiving surface in a vertical direction is substantially constant,
 a second distance between a lower end of the second inner surface and the second receiving surface in the vertical direction is substantially constant, and
 the first distance and the second distance are substantially equal to each other.

4. The combination weighing apparatus according to claim 1,
 wherein a plurality of sliding areas is provided in the chute portion to extend from below the plurality of hoppers to the side of the centerline and be positioned on a lower side as approaching the centerline,
 each of the plurality of sliding areas includes
 a sliding surface forming a bottom surface of the sliding area,
 the first receiving surface connected to the sliding surface on one side of the sliding surface in a horizontal direction when viewed from the side of the centerline, and
 the second receiving surface connected to the sliding surface on the other side of the sliding surface in the horizontal direction when viewed from the side of the centerline,
 the sliding surface, the first receiving surface, and the second receiving surface mutually have an intersecting positional relationship to protrude outward with respect to the centerline,
 a width of the sliding surface increases as approaching the centerline, and
 a width of each of the first receiving surface and the second receiving surface decreases as approaching the centerline.

* * * * *